A. F. NYBERG.
EGG BEATER.
APPLICATION FILED APR. 19, 1920.
1,399,513.
Patented Dec. 6, 1921.
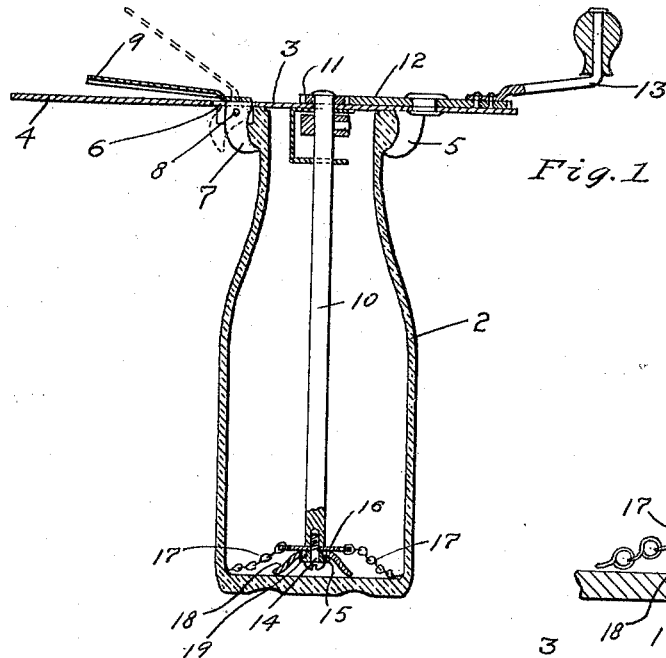
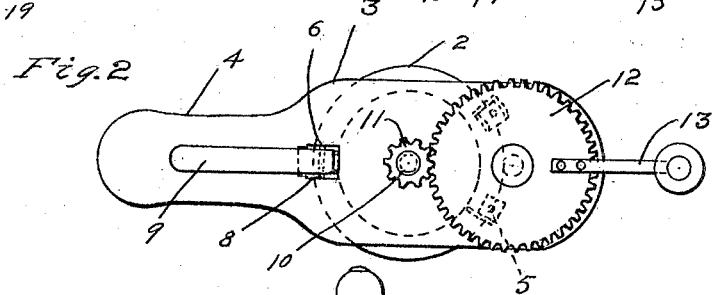
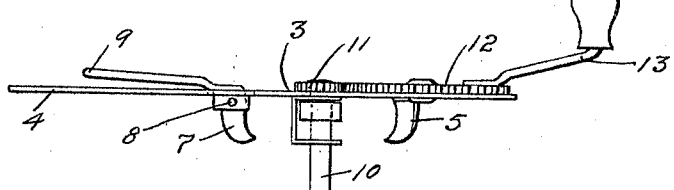
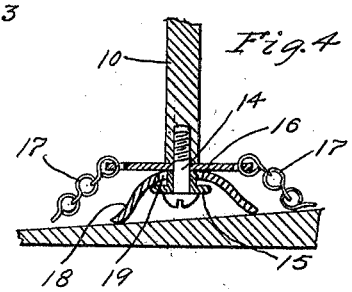
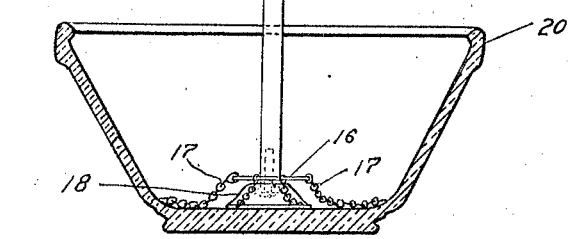
Inventor
ALBERT F. NYBERG
By Paul Haeef
His Attorneys.

UNITED STATES PATENT OFFICE.

ALBERT F. NYBERG, OF MINNEAPOLIS, MINNESOTA.

EGG-BEATER.

1,399,513.                    Specification of Letters Patent.         Patented Dec. 6, 1921.

Application filed April 19, 1920. Serial No. 374,999.

*To all whom it may concern:*

Be it known that I, ALBERT F. NYBERG, a citizen of the United States, resident of Minneapolis, county of Hennepin, State of Minnesota, have invented certain new and useful Improvements in Egg-Beaters, of which the following is a specification.

The object of my invention is to provide a device which may be used for beating purposes in a milk bottle, bowl or any kitchen utensil or article in which it may be convenient or desirable to use a device of this kind.

A further object is to provide a beater which will automatically adapt itself to any unevenness or irregularity of the surface on which it may be placed, and may be used for beating eggs, cream, custards and the like.

A further object is to provide a beater equipped with means for securing it on the neck of the bottle in which the beater may be placed.

Other objects of the invention will appear from the following detailed description.

The invention consists generally in various constructions and combinations, all as hereinafter described and particularly pointed out in the claims.

In the accompanying drawings forming part of this specification,

Figure 1 is a vertical sectional view through a milk bottle and egg beater, embodying my invention, Fig. 2 is a plan view of the same.

Fig. 3 is a detail sectional view of the lower portion of the beater, showing the tilting cup-like device that is seated on the bottom of the bottle, bowl, or other utensil, Fig. 4 illustrates the way the cup tilts to adapt the device for an inclined or irregular surface.

Fig. 5 illustrates the manner of using the beater in a bowl, which, of course, may be of any suitable size and shape.

In the drawing, 2 represents an ordinary milk bottle, 3 is a plate preferably of metal, having a hand grip 4 at one end and provided on its under side with rigid jaws 5 that are curved to fit the upper portion of the neck of the bottle. A slot 6 is formed in the plate 3 and a jaw 7 is pivoted at 8 in said slot and is adapted to engage the opposite side of the neck of the bottle from the jaws 5 and is provided with a lever 9 that is adapted to swing down toward the surface of the hand grip 4 so that the user of the device can place the thumb or finger over the lever 9 and bearing down thereon cause the neck of the bottle to be gripped securely between the jaws 5 and 7. A shaft 10 is mounted to revolve in the plate 3 and is provided at its upper end with a comparatively small pinion 11 meshing with a large gear 12 that is pivoted on the end of the plate 3 which overhangs the top of the bottle on the opposite side thereof from the hand grip 4. This gear 12 is provided with a crank 13 and when the gear is revolved a rapid rotary movement will be imparted to the pinion 11 and the shaft 10 on which the pinion is mounted. The lower end of the shaft has a screw 14 tapped therein and on said screw is a washer 15 between which and the end of the shaft a disk 16 is securely clamped. This disk is provided with a series of short lengths of chain 17 attached at one end to the edge of the disk and suitably spaced thereon and having their other ends free to slide around on the bottom of the receptacle and thoroughly agitate and beat the contents thereof. The links of the chain allow for flexible movement thereof so that through centrifugal action the contents will be thrown out toward the walls of the receptacle when the device is operated at high speed, and that at a slower speed the chains will drop down and slide on the bottom, the effect being that the contents of the receptacle will be thoroughly mixed and beaten.

I prefer to provide a device 18 in the form substantially of an inverted cup having a comparatively large opening 19 therein to receive the hub of the washer 15 which allows the cup to rock freely thereon and adjust itself to the irregularities of the surface on which the beater may be placed. This feature of the device is illustrated clearly in Fig. 4 where the cup is shown tilted, such movement being permissible by reason of the large opening therein so that even though the bottom of the bowl or container may be irregular, the device will automatically seat itself so that it can be held firmly by pressure on the shaft during the beating operation.

In Fig. 5 I have shown a bowl 20 having an open top and a suitable bottom on which the beater is seated and when the crank 13 is operated, the shaft will be revolved and the flexible beaters thrown out by centrifugal force to thoroughly mix and agitate the contents.

I claim as my invention:

1. An egg beater comprising a plate, jaws fixed thereon and adapted to engage the neck of a bottle on one side thereof, a movable jaw mounted to engage the neck of the bottle on the opposite side from said fixed jaws, a shaft mounted in said plate, means for revolving said shaft, and a beating device carried by said shaft.

2. A beater comprising a plate adapted to be seated over the open mouth of a bottle and having a hand grip on one side, fixed and movable jaws carried by said plate for engaging the neck of the bottle, said movable jaw having a lever adjacent said hand grip whereby the user can grasp the hand grip and lever at the same time, a shaft mounted in said plate, and an egg beater device carried by said shaft.

3. An egg beater comprising a plate having jaws adapted to grip the neck of a bottle, a shaft mounted in said plate, a beating device, said plate having a hand grip on one side, a gear mounted on said plate on the other side thereof from said hand grip and having an operating crank, and a pinion mounted on said shaft and meshing with said gear.

4. An egg beater comprising a shaft and means for revolving it, a member in the form of an inverted cup loosely mounted on the lower end of said shaft and adapted to tilt to adjust itself to an inclined or uneven surface, a disk supported by said shaft and having a peripheral edge above the outer edge of said member and comparatively short sections of chain loosely mounted at one end at intervals in the periphery of said disk and normally resting upon the bottom of the utensil in which the beater is placed, said chain sections being thrown out by centrifugal force when said shaft is revolved.

In witness whereof, I have hereunto set my hand this 16th day of April, 1920.

ALBERT F. NYBERG.

Witnesses:
    EDWARD A. THIEM,
    CONSTANCE JARSTAD.